FIG.1

Aug. 8, 1961  H. C. A. VAN DUUREN  2,995,626
FREQUENCY SIGNAL TELECOMMUNICATION SYSTEM
Filed July 25, 1956  7 Sheets-Sheet 2

CODE-CONVERSION TABLE

| FIGURES | LETTERS | a b c d e f | FIGURES | LETTERS | a b c d e f |
|---|---|---|---|---|---|
| UNP. TAPE | | o o o    o o <br> o o o x o o | ) | L | o x o    o x <br> o x o o o x |
| 3 | E | x o o    o o <br> x o o x o o | 2 | W | x x o    o x <br> x x o o o x |
| LINE FEED | | o x o    o o <br> o x x x o o | £ | H | o o x    o x <br> o o x x o x |
| − | A | x x o    o o <br> x x o x o o | 6 | Y | x o x    o x <br> x o x x o x |
| SPACE | | o o x    o o <br> o o x x o o | 0 | P | o x x    o x <br> o x x o o x |
| , | S | x o x    o o <br> x o x x o o | 1 | Q | x x x    o x <br> x x x o o x |
| 8 | I | o x x    o o <br> o x x o o o | 9 | O | o o o    x x <br> o o o x x x |
| 7 | U | x x x    o o <br> x x x o o o | ? | B | x o o    x x <br> x o o x x x |
| CARR. RET | | o o o    x o <br> o o o x x o | @ | G | o x o    x x <br> o x o o x x |
| | D | x o o    x o <br> x o o x x o | FIGURES | | x x o    x x <br> x x o o x x |
| 4 | R | o x o    x o <br> o x o o x o | . | M | o o x    x x <br> o o x o x x |
| BELL | J | x x o    x o <br> x x o o x o | / | X | x o x    x x <br> x o o x x |
| , | N | o o x    x o <br> o o x x x o | = | V | o x x    x x <br> o x x o x x |
| % | F | x o x    x o <br> x o x x x o | LETTERS | | x x x    x x <br> x x x o x x |
| : | C | o x x    x o <br> o x x x x o | | | |
| ( | K | x x x    x o <br> x x o x x o | £ <br> ß <br> I <br> II | | o o x o o o <br> x x o x x x <br> x o o o x o <br> o x x x o x |
| 5 | T | o o o    o x <br> o o x o o x | TRIGGER A" <br>          B" <br>          C" <br>          D" | | o o = f1 <br> x o = f2 <br> o x = f3 <br> x x = f4 |
| + | Z | x o o    o x <br> x o o o o x | | | |

T&R { UNP. TAPE, LINE FEED
T { −/A
T { :/C
T&R { (/K
T&R { 5/T
T { +/Z
T { ./M
T&R { /X

FIG. 2

H.C.A. VAN DUUREN
INVENTOR.

BY Hugh A. Kirk

Aug. 8, 1961    H. C. A. VAN DUUREN    2,995,626
FREQUENCY SIGNAL TELECOMMUNICATION SYSTEM
Filed July 25, 1956    7 Sheets-Sheet 4

FIG.4

H.C.A. VAN DUUREN
INVENTOR.
BY

Aug. 8, 1961   H. C. A. VAN DUUREN   2,995,626
FREQUENCY SIGNAL TELECOMMUNICATION SYSTEM
Filed July 25, 1956   7 Sheets—Sheet 6

FIG. 6a
(BISTABLE MULTIVIBRATOR TYPE)

FIG. 6b
STANDARD MONOSTABLE MULTIVIBRATOR
TRIGGER CIRCUIT

H.C.A. VAN DUUREN
INVENTOR.

BY Hugh A Kirk

Aug. 8, 1961  H. C. A. VAN DUUREN  2,995,626
FREQUENCY SIGNAL TELECOMMUNICATION SYSTEM
Filed July 25, 1956  7 Sheets-Sheet 7

H.C.A. VAN DUUREN
INVENTOR.

2,995,626
FREQUENCY SIGNAL TELECOMMUNICATION SYSTEM
Hendrik C. A. van Duuren, Wassenaar, Netherlands, assignor to De Staat der Nederlanden, ten deze Vertegenwoordigd door de Directeur-Generaal der Posterijen, Telegrafie en Telefonie, The Hague, Netherlands
Filed July 25, 1956, Ser. No. 600,001
Claims priority, application Netherlands July 26, 1955
29 Claims. (Cl. 178—51)

This invention deals with a telecommunication system and its frequency modulated code signals. More particularly, it deals with a multi-element code communication system in which the elements correspond to different frequencies, such as for example for communication of a five unit telegraph code via a three element code of four different frequencies between two or more stations.

Although Dutch Patent No. 39,556 discloses a system for communicating code signals in which each signal comprises a plurality of time spaced elements having different frequencies, its code employed does not have any particular sequence in which the frequencies of the different elements are to occur in each signal, so that for a code with three elements and four different frequencies, up to 64 different signals may be produced. However, since in such a code it is possible that the same frequency may occur in two or more successive elements of one signal, it is necessary to have synchronization of the elements in the signal both at the transmitter and receiver for scanning of the frequency which occurs during the time of each element. Such a system also requires two wires and a ground or similar plurality of circuits in order to obtain this required synchronization.

It is an object of the present invention to provide a communication system of multi-element signals in which the elements have different frequencies, but in which no synchronization is required, thereby greatly increasing the efficiency, economy, simplicity and effectiveness of the system.

Another object is to provide such a system which is adapted for telegraph, telephone, and radio including aircraft code signals in which both the transmitter and receiver may be located in the same place and use the same antenna or be in a network, since only one frequency is transmitted at a time.

Another object is to provide such a system in which fading and other influences on the signals during transmission are much smaller and there is a much less chance for element distortion, than in previously known synchronization multi-element code telecommunication systems.

Another object is to provide such a system in which the limitations of duration of the elements in each signal are limited only by the receiver input filters for selecting the different frequencies employed in the signal and the transient time of these filters.

Another object is to produce such a system in which more channels may be inserted on a given multiplex channel, in that the time length of each element of each signal may be reduced so that the capacity of the system may be greatly increased over that possible in known synchronous systems.

Another object of this invention is to provide such a system in which the completeness of signals received may be automatically detected, and if an error occurs the station from which the erroneous signal was sent may be informed to repeat said signal before its next signal is ready to be transmitted.

Generally speaking, the different frequencies of the multi-elements in each signal according to the communication system of this invention are arranged so that adjacent elements in each signal always have different frequencies. This enables the changes in frequency to be detected at the receiver end of the system and counted for error detection rather than the occurrence and/or given duration of the frequency for each element. Thus as long as the given number of changes in identifiable frequencies occur in each signal within a reasonable time from the start of each signal and before the next signal is to be transmitted, a complete reception of that signal is effected regardless of how long in duration or when the different frequencies corresponding to the given number of elements of the signal occur, provided they occur within a reasonable signal range which generally is not longer than about one element of time longer than the time allotted for transmission of all of the elements of one signal. Since the frequency in each adjacent element of a signal must be different, it is possible to employ a combination in which only two different frequencies may be used alternately for the elements in sequence in the signal. However, as an example in this description of this invention, a code system comprising three elements and four different frequencies has been employed, permitting 4×3×3 or 36 different signals or combinations of three elements in these signals, so that three identifiable changes in frequency must be detected for complete reception of each signal. These changes in frequency may be detected and also counted in a counting circuit, and if these do not occur within the time reasonably permitted for the transmission of all of the elements of the signal, then an erroneous signal has been received, and the receiver returns to its initial state for the reception of another and new signal.

If a sufficient space between the last and first elements of each of the signals transmitted is allowed so that the elements only occupy part of the time allotted for each signal, it is also possible to receive back a signal from a remote station during this unoccupied time of each signal to give special warning or correct reception signals, and/or to insert additional signal channels.

With the 36 different possible combinations of elements for signals, more than sufficient signals are provided for the transmission of the 32 different combinations of the international Baudot five unit telegraph code. However, in order to adapt this international 32 signal five unit code system into the above mentioned three element code, the five unit international telegraph code is converted into a six unit code having three pairs of four different combinations of two units. By inserting one unit between the third and fourth units of the international telegraph code to make up this six unit code, it was found that there were only eight exceptions in which adjacent pairs of units were the same which needed to be converted. This conversion may be done in an electronic code converter circuit employing resistor-diode combinations. A similar code converter is also required at the receivers of the system, in which the fourth unit of each of the 36 different six unit combinations is ignored, and four of the eight above mentioned exceptional signals must be re-converted.

In a transmitter circuit according to said example of this invention, the different pairs or combinations of units forming the three elements of the signal may be set-up on a group or pair of monostable multivibrator trigger circuits, which produce any one of four different voltages for controlling a multivibrator which produces the four different frequencies to be transmitted corresponding to one of the three elements of each signal. A distributor circuit is also employed for producing these frequencies in their proper sequence in each signal from another group or six bistable trigger circuits upon which the five units of the international telegraph code may be recorded from a tape controlled by impulse generators.

The receiver circuit for such a system may comprise four frequency selective filters for each of the four different frequencies to be detected, which filters may be in turn connected to a first group or four bistable multivibrator trigger circuits which control two other groups of trigger circuits, one bistable multivibrator group for storing the separate pairs of units of the elements detected and the other monostable multivibrator group for counting the number of changes in the frequency in each signal to determine its complete reception. Between the first group and the group of unit storing trigger circuits, there may be provided a code converter to convert the four exceptional signals which may not be directly transferred to an international telegraphic code printer controlling circuit. In the event that the number of changes in frequency received does not correspond with the number of elements in the signal, there may also be provided a bistable multivibrator circuit for blocking the operation of the printer controlling circuit and/or also a blocking return signal transmitter at this receiver station from operating to indicate that the just received signal was incomplete and should be repeated. Stop and start unit pulsing circuits for each signal and a distributor may be employed to control the printer controlling circuit in reproducing the received international telegraph code signals.

The above mentioned and other features and objects of this invention and the manner of attaining them are given more specific disclosure in the following description of an embodiment of this invention taken in conjunction with the accompanying drawing, wherein:

FIG. 6a is a schematic wiring diagram of a basic or standard type of bistable multivibrator trigger circuit according to the block trigger circuits shown in FIGS. 3, 4 and 5a, with corresponding reference characters to the terminals indicated in FIG. 5a;

FIG. 6b is a schematic wiring diagram of a basic or standard type of monostable multivibrator trigger circuit which may be adapted from the circuit in FIG. 6a for the monostable block trigger circuits shown in FIGS. 3, 4 and 5a;

I. The signal

Figure 1:
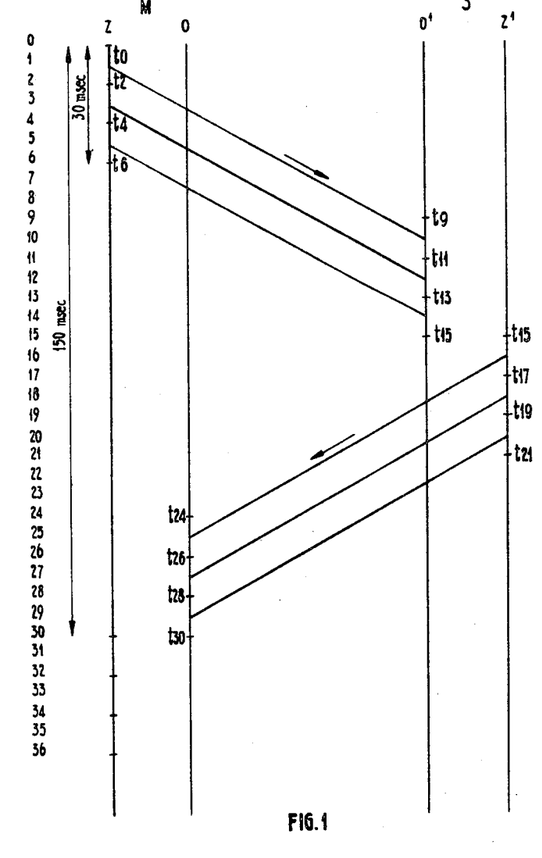
FIG. 1 is a schematic time diagram of the sending and returning of a three element signal between two stations in a network within a 150 millisecond time interval, in accordance with one example of a signal produced and communicated according to this invention.

The communication in a network of the previously mentioned example of a three element signal according to the present invention is diagrammatically illustrated in FIG. 1, in which the time available for each signal is taken to be 150 milliseconds and the duration of each element is 10 milliseconds, or 2 of the 5 milisecond intervals numbered vertically along the left hand side of FIG. 1. The three elements of the signal occupy 30 milliseconds with a rest time thereafter of 120 milliseconds, which rest time may be made available for the reception and return of a similar signal from a distant or slave station S back to a master station M. These to and from signals are shown by the two sets of heavy diagonal lines in FIG. 1. It is also possible in the available 120 milliseconds space between signals to transmit another four channels of 30 milliseconds each, if desired, and furthermore the time of transmission of a frequency during each element may be reduced from 10 to about 5 milliseconds so there will be an additional 5 millisecond pause at the end of each element and still effect the transmission desired.

Referring now more specifically to the time diagram of FIG. 1, from vertical line locating the transmitter Z at the master station M there are sent succesively three 10 millisecond signal elements as indicated by the three heavy lines sloping downwardly to the right to the vertical line locating the receiver station O' at the slave station S of a network. According to this diagram, it takes 45 milliseconds for a signal to travel from station M to station S or vice versa i.e. from $t_0$ to $t_9$, or $t_{15}$ to $t_{24}$, respectively. As soon as the complete signal from the master station M is received at slave station S, another signal may then be immediately transmitted back from its transmitter Z' to the receiver O at master station M in accordance with the three heavy lines sloping downwardly from the right to the left in FIG. 1 to complete both the to and from signals within the 150 millisecond time allotted for one complete signal. This return signal from the slave station S may also be used to indicate whether a correct signal has been received from the master station M before the next signal is sent out from the master station M, and if no signal or an error indicating signal is sent from the slave station S back to the master station M, such may then automatically cause the first signal to be repeated before another or new signal is sent from the master station M, thus thereby avoiding the storing at the master sending station of more than one signal at a time.

An important advantage of the system of this invention is that it is not essential that the time during which each element is received, falls within the exact time at which that element was sent, if at least three changes in frequency are received within about one and one third of the time it takes to transmit all three elements of that signal. Thus, atmospheric disturbances or anything which may delay or decrease the time that the transmitted frequency is received during each element, does not affect the signal as a whole provided the changes in frequency and the identity of each frequency may be detected within the reasonable time allotted for the reception of each signal. Thus for example, the reception of the signal in which the element ratio instead of being 10:10:10 milliseconds as transmitted, is distorted due to interference to be 5:2:12 milliseconds, may still be correctly received, while such a distorted signal is not possible of being correctly received by synchronous systems previously known.

II. Code conversion

Figure 2:
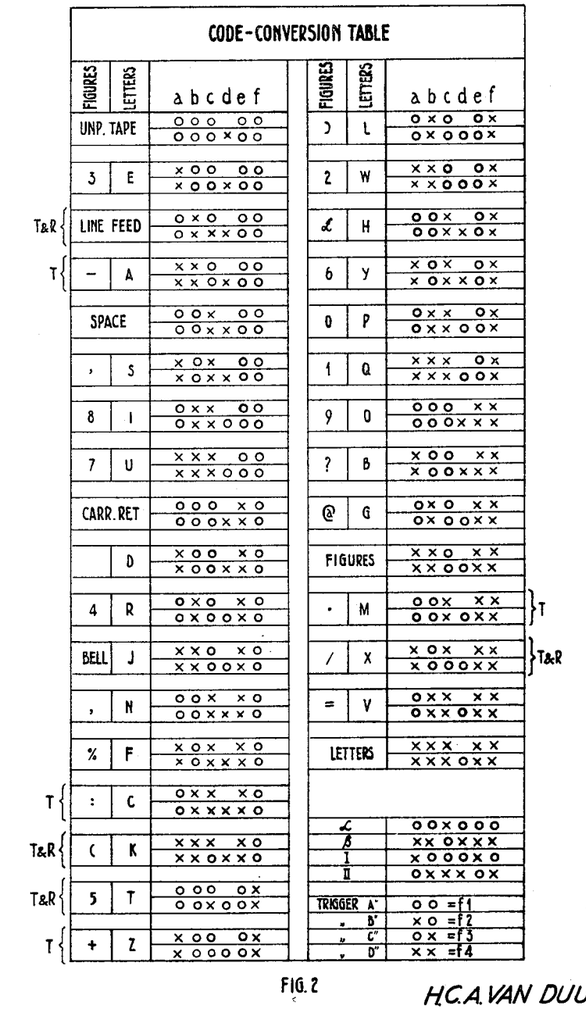
FIG. 2 is a code conversion table for a five unit international telegraph code into a six unit code of four different pairs in three elements in accordance with a specific embodiment of the signal of this invention similar to that which may be transmitted in accordance with the diagram shown in FIG. 1.

In order to produce the three element frequency code signal illustrated schematically in FIG. 1, from a 32 signal standard five unit international telegraph Baudot code as shown in the first or upper line of each of the figures and letters listed in the table of FIG. 2, a conversion into a six unit code shown on the second or lower line of each figure and letter is required. These units of both the five and six unit codes may only have one of two polarities, namely: "o" or space or start polarity units and "x" or mark or stop polarity units.

The six unit code thus consists of three successive pairs of units which pairs form four separate combinations as shown in the lower right corner of the table of FIG. 2 as follows:

*oo* corresponding to frequency *f1*,
  *xo* corresponding to frequency *f2*,
  *ox* corresponding to frequency *f3*, and
  *xx* corresponding to frequency *f4*.

This means that there are four different combinations taken three at a time in which any two adjacent pair of combinations in one signal are different so at least three different changes of frequency can be detected for each signal. This permits the previously described 4×3×3 or 36 different possible combinations or signals as disclosed in the chart which include not only the 32 signals of the Baudot telegraph code but also four additional combinations or signals α, β, I, and II, shown near the lower right of the table in FIG. 2, which additional signals may be used for "idle time" signals, such as signals and, and/or for warning, error and other indications as desired, thereby materially increasing the flexibility of the system of this invention.

In order to effect this conversion, an additional unit is inserted between the third and fourth units of the five unit code which additional unit is opposite in polarity to that of the second unit of the five unit code, except for the following eight figures and letters:

Line Feed, A, C, K, T, Z, M, and X. These eight signals must be modified for the above general rule in such a way that the middle combination or pair of units differs from the preceding pair as well as from the succeeding pair by either changing the additional unit to be the same as the second unit in the Baudot code or changing also the third unit of the six unit code to be opposite from the third unit of the Baudot code. The first of these exceptions occurs for the four letters A, C, Z and M (marked "T" at side of FIG. 2), and their corresponding figures; wherein if the added fourth unit in the six unit code were different or opposite from the second unit of the five unit code, then the second pair of units in the six unit code would be the same as the third pair. Accordingly in these four signals the inserted unit in the six unit code is made to be exactly the same as the second unit in the five unit code.

There are still four other exception combinations in which even this change does not meet the final requisites of three different pairs of units in the six unit code, so that still another conversion, namely of the third unit of the six unit code also must be changed to be different or opposite in polarity from the third unit of the five unit Baudot code, which is the case for the letters Line Feed, K, T and X (marked "T and R" at side of FIG. 2) and their corresponding figures. In these cases, if the fourth or additional unit in the six unit code were of the opposite polarity to that of the second unit in the five unit code, the middle pair of units in the six unit code would be the same as the first pair of units, while if it were made of the same polarity, the middle pair would be the same as the last pair of units. Therefore, an additional change in the polarity of the third unit of the six unit code from that of the third unit of the Baudot code is also required for these four additional signal exceptions as well as the conversion made for the other four signal exceptions mentioned above.

III. Transmitter

Figure 3:
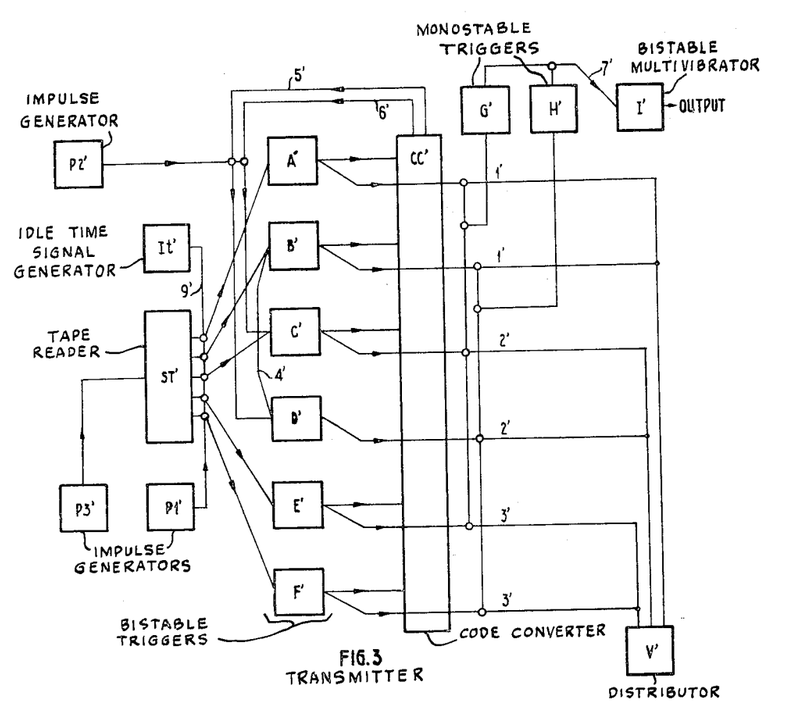
FIG. 3 is a schematic block diagram of a transmitter circuit for a three element four different frequency code signal in accordance with that shown in FIG. 2.

One schematic diagram of a transmitter circuit for converting a five unit telegraph code as disclosed in FIG. 2 into the six unit code of three pairs of four different types of frequency elements and transmission of said frequency elements is disclosed in FIG. 3. This circuit comprises a telegraphic five unit code tape reader or transmitter ST' which may be instigated by an impulse generator P3' for stepping the tape through the reader after each five unit code signal thereon is read. One of two opposite polarity impulses corresponding to each of the five units of each signal read from the tape may be instigated by an impulse generator P1' which also may control idle time signals generated in a separate circuit I *t'* connected to the same common conductor 9' as the five outlets for the read units from the tape reader ST'.

Corresponding to each of the five outlets from the tape reader ST' are provided five bistable multivibrator trigger circuits A', B', C', E' and F' of a first group of trigger circuits (see FIG. 6a) to which said outlets are correspondingly also connected. Between the trigger circuits C' and E' is inserted a similar and additional bistable multivibrator trigger circuit D' in the same group for the fourth and additional unit in the six unit code which is to be formed before the three element code to be transmitted in accordance with this invention can be produced. Since added fourth unit D' is dependent upon the polarity of the second unit of the five unit code, the input to trigger circuit D' is directly connected by a conductor 4' to the input to the second unit trigger circuit B' for the eight exceptional cases wherein it is to be of the same polarity as the unit to trigger circuit B'. However, since this added unit is generally of an opposite polarity from the unit to trigger circuit B', the outputs from all of the six trigger circuits A' through F' are connected to a code converter circuit CC' from which through conductors 5' and 6' and under the control of an impulse generator P2', the trigger circuits C' and D' are controlled to store different polarity units for these eight exceptional cases (letters "T" and "T and R" of FIG. 2).

The outputs of all these six bistable trigger circuits A' through F' are alternately also connected to a second group of monostable multivibrator trigger circuits G' and H' (see FIG. 6b), which outputs are controlled by a distributor circuit V'. The bistable trigger circuits A', C' and E' are multipled to the monostable trigger circuit G', and the bistable trigger circuits B', D' and F' are multipled to the monostable trigger circuit H'. The distributor circuit V' connects both multiples at junctions or connections 1', 2' and 3' in succession to both monostable trigger circuits G' and H' to produce the four possible different combinations of the elements (i.e.: *oo, xo, ox, xx*) of the signal to be transmitted. The control of the monostable trigger circuit G' and H' by the distributor V' is effected by circuits analogous to those of FIGS. 5a and 6b described later in Section V. Corresponding to each of these different combinations, different voltages are produced from the outputs of the combined second group of monostable trigger circuits G' and H' through conductor 7' connected to a bistable type of multivibrator circuit I' which is responsive to these different voltages to produce four different frequencies at its output to be transmitted in a signal channel either by radio or over a conductor or line.

IV. Receiver

Figure 4:
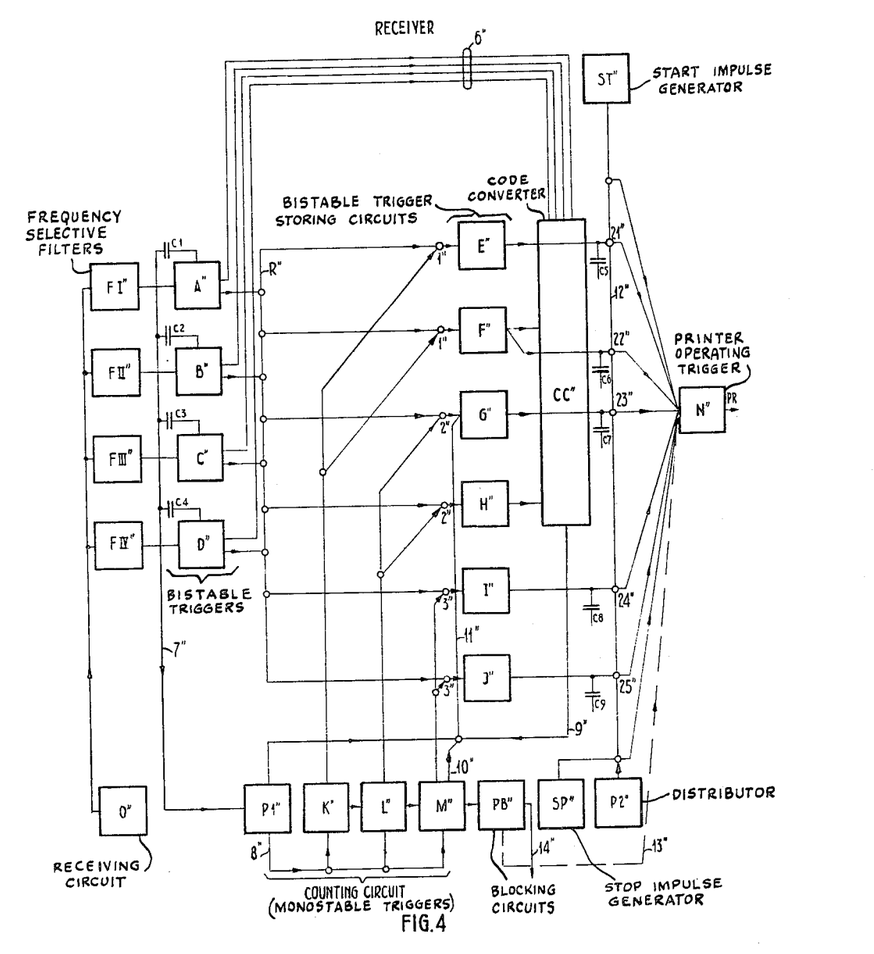
FIG. 4 is a block diagram of a receiver circuit for signals transmitted by a transmitter circuit similar to that shown in FIG. 3 including a counting circuit for detecting the complete transmission of the elements of each signal as each signal is received.

A block diagram of a receiver circuit for receiving the signal corresponding to that produced and transmitted by the circuit of FIG. 3 in accordance with the six unit code shown in FIG. 2 is shown in FIG. 4, wherein the three successive incoming frequency elements of each signal are received in a circuit O". The output of the receiving circuit O" is multipled to four frequency selector filter circuits F1", F2", F3", and F4" for each of the four different possible frequencies produced by the multivibrator I' in the transmitter circuit of FIG. 3. Directly connected to each of the four frequency selectors FI", FII", FIII" and FIV" is a first group of bistable multivibrator trigger circuits A", B", C" and D" (see FIG. 6a), respectively, whose outputs are correspondingly connected through separate conductors 6" to a code converter circuit CC", to a collecting rail R" and through condensers C1 through C4 and conductor 7" to a counting circuit. Each time any one of the first group of bistable trigger circuits A" through D" is operated, the start of its operation in response to a corresponding frequency produces a pulse which is transmitted through its corresponding condenser C1, C2, C3 or C4 to the counting circuit comprising a second group of four monostable multivibrator trigger circuits (see FIG. 6b) the first monostable trigger circuit of which comprises an impulse generator P1" and the other three monostable trigger circuits K", L" and M" of which group are connected from the output of generator P1" via conductor 8" to respond and count successively each of the three elements of each signal. Thus, the first counting monostable trigger circuit K" of the second group of trigger circuits responds to the first element received to control through connections 1" the operation of the first two (E" and F") of a third group of six bistable multivibrator trigger circuits E" through J" corresponding to each of the six units of the code being transmitted. Correspondingly, the second counting monostable trigger circuit L" controls through connections 2" the operation of the second two bistable multivibrator trigger circuits G" and H"; and the third counting monostable trigger circuit M" controls through connections 3" the last two bistable multivibrator trigger circuits I" and J". The collecting rail R" is correspondingly separately connected to the connections 1", 2", and 3" at each of the six or third group of bistable multivibrator trigger circuits E" through J" (see FIG. 6a).

Since all but four of the 32 signals of the code as shown in FIG. 2 have the same units as the five unit code, the conversion back to the five unit Baudot code may be made by merely ignoring the added fourth unit of the six unit code in all but the four exceptional cases. These four cases or signals are for the letters Line Feed, K, T, and X (marker "T and R" in FIG. 2) and their corresponding figures, which were the only four signals to have the polarities of their third units changed in the transmitter circuit of FIG. 3 from the corresponding third units of the five unit code. Thus, the fourth trigger H" in the receiver circuit of FIG. 4 corresponding to the previously added fourth unit in the six unit code, needs be connected to the code converter circuit CC" which has connected to it also the second trigger F" and all of the first and bistable group of trigger circuits A" through D" through conductors 6". The third unit to be changed is controlled by the third trigger circuit G" in the third and bistable group of trigger circuits E" through J", and changed by a connection through conductor 9" from the code converter circuit CC" and delayed output 10" from the last or third and monostable counting trigger circuit M" via conductor 11" to the input of the trigger circuit G". The delayed output from the counting trigger M" is employed in order to prevent the trigger G" from changing over to an arbitrary impulse from the counting impulse generator P1". Accordingly, only the output of the bistable trigger circuits E", F", G", I" and J" are directly connected to conductor 12" through connections 21", 22", 23", 24" and 25" and thence to the output bistable multivibrator trigger circuit N" under the control of a distributor P2". This trigger N" may then be employed to control the operation of printer through a connection PR. The control of the voltages at junctions or connections 21", 22", 23", 24", and 25", is effected at intervals by impulses from a starting pulse generator circuit ST" and condensers C5 through C9 respectively, which control the printer through the output circuit N". In order to start and stop such a printer at the end of each series of five unit impulses making up one signal, there are provided the start impulse generator circuit ST" and a stop impulse generator circuit SP" both connected to the same conductor 12", which are also controlled by the operation of the distributor P2", so that for each signal first a start impulse is given to the trigger N", then in succession each of the five units of the reconverted Baudot telegraph code signal, and then a stop impulse.

There also may be provided a blocking circuit PB" which may comprise a bistable multivibrator or trigger circuit and which is connected to the output of the counting circuit, specifically to the output of the third counting trigger circuit M", which blocking circuit herein normally blocks the printer operating trigger circuit N" via connection 13" until the blocking circuit M" is operated by the detection of the third element or third change in frequency indicating the reception of a complete signal. The blocking circuit PB" also through conductor 14" may control the transmitter at the same station as the receiver of FIG. 4 to cause the transmission of an error indicating signal, or prevent said near transmitter from transmitting at all, so as to indicate automatically to the transmitter at the distant station that the signal just received was incomplete and should be repeated, as previously mentioned in describing the time diagram shown in FIG. 1 and in Section I of the specification above.

V. Counting circuit

Figures 5A, 5B:
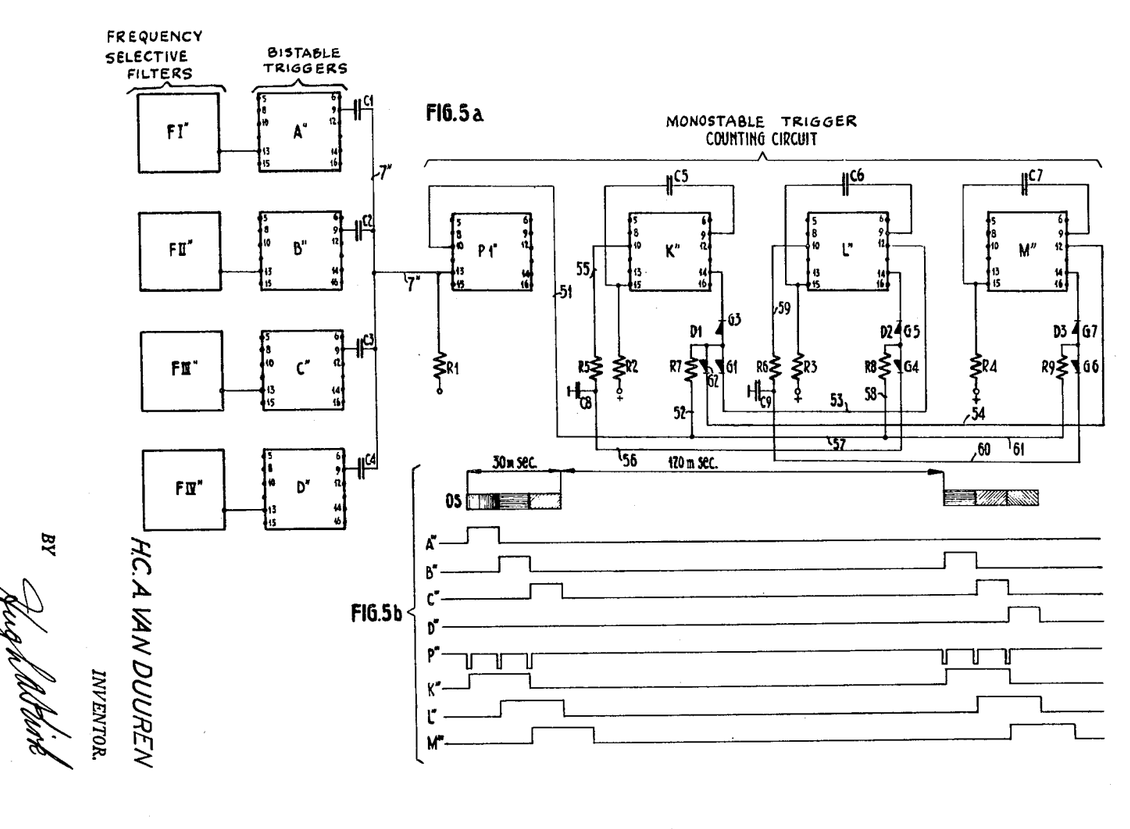
FIG. 5a is a more detailed schematic wiring and block diagram of the counting circuit operating portion of the receiver circuit shown in FIG. 4.
FIG. 5b is a diagram of the wave forms produced in the counting circuit shown in FIG. 5a in response to a signal similar to that shown in FIG. 1.
Figure 6A:
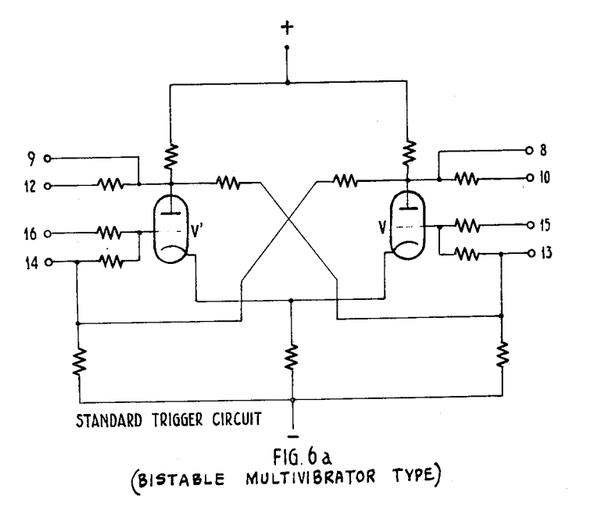
Figure 6B:
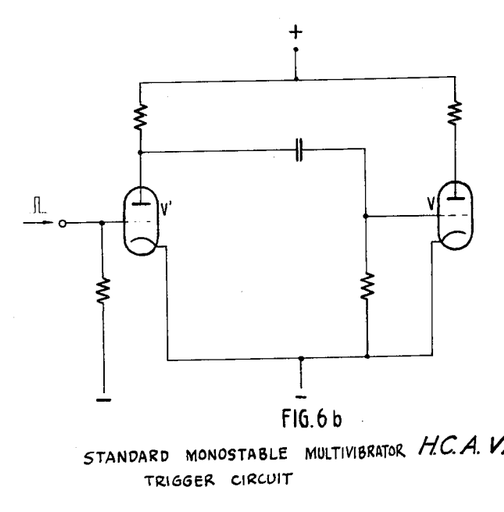

Before describing the operation of the code converter circuit in more detail, attention is called to the wiring diagram of the standard type of bistable multivibrator trigger circuit shown in FIG. 6a which is employed for each of the bistable multivibrator trigger circuits A' through F', I', A" through J", PB" and N" mentioned in both the receiver and transmitter, and in which the inlet and outlet terminals are numbered correspondingly on the trigger circuit blocks in FIG. 5a. This trigger circuit is shown to comprise two thermionic vacuum tubes V and V', the former (tube V) of which is normally conductive in the herein non-operated condition or state of the circuit, and the latter (tube V') of which is normally non-conductive. As soon as an impulse is received at the input terminals 14 or 16, this non-operated condition is changed and the tube V' becomes non-conductive to change the potentials at all of the output terminals 9, 12 or 8, 10. However, for the monostable multivibrator trigger circuits G' and H' (in the transmitter) and P1", K", L" and M" (in the receiver), a wiring diagram similar to that of FIG. 6b may be employed.

Referring now to FIG. 5a there is shown a schematic and wiring diagram of the input frequency selector filters F I" through F IV" and the first and second groups of multivibrator trigger circuits (A" through D", P1", K", L" and M") including the counting chain of the receiver circuit in FIG. 4 and the interconnecting resistor-diode combinations between the triggers of the counting circuit.

For the purpose of explanation of the operation of this counting circuit, assume that the first element (see wave A'" in FIG. 5b) of the first signal (see wave OS in FIG. 5b) which passes filter FI" to the trigger A" causes the trigger A" to change its state, say for 10 milliseconds according to the above example for a normally unmutilated signal element. The starting of the operation of the trigger circuit A" produces an impulse at its output terminals 6 and 9 which impulse passes through the condenser C1 and produces a short negative impulse (see wave P'" in FIG. 5b) in the conductor 7" connected to the normally positive input terminal 13 of the impulse generator trigger circuit P1" of the counting circuit. As a result of this, the output terminal 10 of the impulse generator circuit P1" produces a similar short but positive pulse conducted via conductors 51 and 52 to the lower end of the resistor R7 adjacent the input terminal 14 of the first counting trigger circuit K". The lower ends of the diodes or rectifiers G1 and G2 at this input junction are already positive since they are connected respectively to the normally positive output terminals 12 of the other two counting trigger circuits L" and M" via conductors 53 and 54, respectively. Thus, the input terminal 14 of the first counting trigger circuit K" becomes positive, which causes this trigger to change over to its operative state. As a result of this change-over its output terminal 10 becomes positive, which potential is passed, with a delay caused by a delay circuit of resistor R5 and condenser C8, through conductors 55 and 56 to place a positive potential on the lower end of the diode or rectifier G4 adjacent the input terminal 14 of the second counting trigger L". The delay caused by the R5—C8 circuit prevents the trigger circuit L" from operating also by the same impulse from the impulse generator P1" which just operated the first counting trigger circuit K". By this positive potential now applied to the rectifier G4, the condition is prepared in which the input terminal 14 of the trigger circuit L" can be rendered positive when the next or second positive impulse is passed on from the impulse generator circuit P1" to the lower end of the resistor R8 via conductors 51, 57 and 58. After a lapse of time determined by a second delay circuit of resistance R2 and condenser C5 connected between output 9 and input 15 of the first counting trigger circuit K", which delay is of approximately twice the duration of the signal element, the trigger circuit K" will return to its initial unoperated state, so as to maintain a positive potential at the lower end of resistor R8 adjacent the second counting trigger L" only for a time corresponding to the double length pulse of wave K'" in FIG. 5b.

Assume also that after 10 milliseconds from start of the first element just received and counted, a second element arrives which via filter F II", operates the trigger circuit B" (see wave B'" in FIG. 5b) and thence causes a second short negative impulse to be conducted over line 7" to the same input terminal 13 of the impulse generator P1" of the counting circuit, which second impulse occurs after the impulse generator circuit P1" has returned to its initial normally unoperated state, in that no time constant or delay circuits are connected to this trigger circuit P1" to delay its return operation after the first short pulse has passed (see wave P1'" in FIG. 5b). This quick return to normal of the circuit P1" is effected by the positive potential continuously applied to the lower end of the resistor R1 also connected to its input terminal 13. As a result of this second negative impulse to input 13 of the generator P1", its output terminal 10 again becomes positive which positive potential is conducted again to the lower end of the resistor R7 which still is positive since the trigger circuit K" has not yet returned to its initial state and accordingly this second positive impulse has no influence now on the state of this first trigger K". This same positive potential however, also is conducted to the lower end of the resistance R8 through conductor 57, and since the lower end of the rectifier G4 has already become positive as a result of the changeover of the first counting trigger circuit K", a positive potential is now for the first time applied to the input terminal 14 of the second counting trigger circuit L" which causes it to change over or operate in response to the second element of the signal received. Output terminal 10 of the trigger circuit L" now becomes positive and this positive potential is passed with a certain delay caused by the delay circuit of resistance R6 and condenser C9 via conductors 59 and 60 to the lower end of the rectifier G6. This again must be done with some delay because otherwise the trigger circuit M" would operate by the same impulse together with the trigger L" as described above. By this positive potential which eventually appears at the lower end of the rectifier G6, a condition is prepared in which the input terminal 14 of the third counting trigger M" can be rendered positive, when the next, third or last positive impulse arrives from the impulse generator P1" at the lower end of resistor R9 via conductors 51, 57 and 61. After a lapse of time determined by the time delay circuit of condenser C6 and resistance R3 connected between the output terminal 9 and the input of terminal 15 of the trigger circuit L", this circuit L" will return to its initial state (see wave L'" in FIG. 5b), whether or not the third pulse has been received in the meantime.

Assume further that after another 10 milliseconds time, a third element arrives and is received via filter F III", operates trigger circuit C", which passes a third short negative impulse (see wave P1'" in FIG. 5b) to the input terminal 13 of the impulse generator P1" after the impulse generator P1" has again returned to its initial or normally unoperated state. The output terminal 10 of the impulse generator P1" now becomes positive again and causes a positive impulse to be applied to the lower end of the resistor R7, but the lower end of the rectifier G2 is now negative because the output terminal 12 of trigger L" connected thereto via conductor 53 is now negative because of its previous operation by the second impulse from P1". Consequently, the trigger circuit K" cannot change over. Furthermore, the lower end of the resistor R8 becomes positive but trigger L" has not yet returned to its initial state so a positive potential has now no influence on the state of the second trigger circuit L". This positive potential also appears at the lower end of resistance R9 via conductor 61. Since, the lower end of the rectifier G6 has already become positive as a result of the changeover of the trigger circuit L'", the third counting trigger M" now operates. The output terminal 10 of this trigger M" now becomes positive, but this terminal 10 is not connected to another trigger circuit so that no further counting occurs, but after a time determined by delay circuit of resistance R4 and condenser C7 connected between its terminals 9 and 15, this third counting trigger circuit M" returns to its initial or unoperated state. At this time all the triggers are in their normal unoperated states and the counting process may again recommence with the next signal of three elements to be received.

If any incoming signal of three different frequencies is received which operates any combination of the first group of multivibrator trigger circuits A" through D" (see right ends of waves A'" through D'" in FIG. 5b), the same counting operation will occur, in that the operation of each one of the first group of four bistable trigger circuits A" through D" produces a short negative impulse in conductor 7" to operate the impulse generator P1" of the counting circuit (see wave P1'" in FIG. 5b).

By setting the time delay for the monostable counting multivibrator trigger circuits K", L" and M" each at 2×10 milliseconds, or twice the element length of the elements making up the signal, and substantially less than the time for the next signal to occur, the monostable counting trigger circuits K", L" and M" permit the counting of reasonably delayed and detected elements, and still prevents the counting of the first element of the next signal, which takes a much longer time than the time for the duration of the last time constant circuit of resistance R4 and condenser C5 connected to the third trigger circuit M" to decay.

The blocking circuit PB" may be a bistable multivibrator or trigger circuit as shown in FIG. 6a which is controlled by the third monostable counting trigger circuit M", by having its input terminal 14 connected to the output terminal 10 of the counting trigger circuit M" through suitable coupling cells, such as resistor-diodes or rectifiers.

The other outputs from the monostable multivibrator trigger circuits K", L" and M" of the counting chain to the third and bistable group of multivibrator trigger circuits to junctions or connections 1", 2" and 3", respectively, are not shown in FIG. 5a, but may actually be connected to the output terminals 10 of these counting trigger circuits, while the delayed output conductor 10" shown in FIG. 4 may be connected to the output terminal 9 of the third counting trigger circuit M".

VI. Code converters

Figure 7:
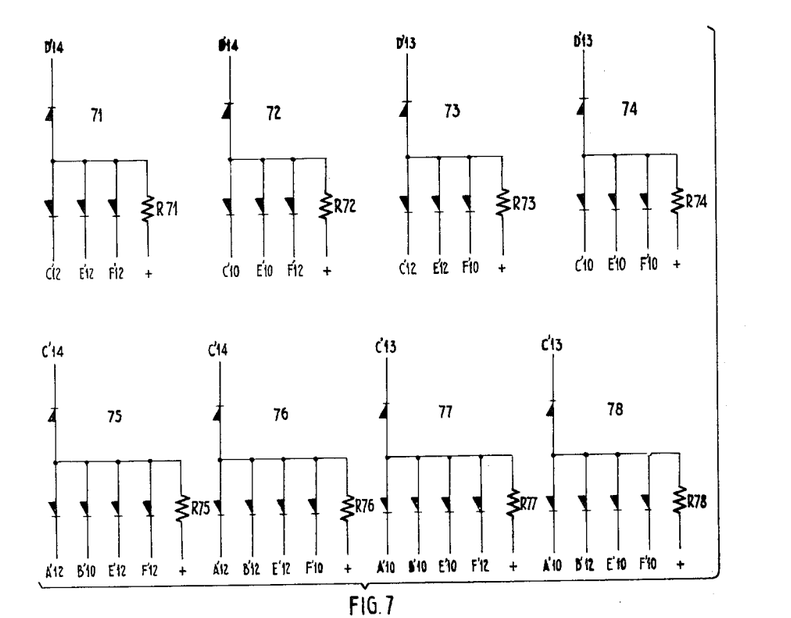
FIG. 7 is a schematic wiring diagram of the circuits of the code converter for the eight exceptional signals which are to be converted from the five to the six unit code by the receiver shown in FIG. 3.
Figure 8:
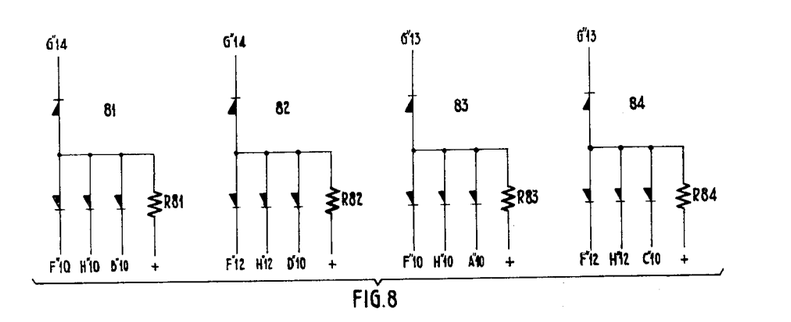
FIG. 8 is a schematic wiring diagram of the circuits of the code converter in the receiver of FIG. 4 for converting the four exceptional signals back into their telegraph code signals as shown in the table of FIG. 2.

In FIGS. 7 and 8 are shown the resistor-diode combinations employed in the code converter circuit CC′ and CC″ for the transmitter and receiver circuits of FIGS. 3 and 4, respectively. The terminals of these circuits are correspondingly given reference characters for the terminals of the trigger circuits in their respective transmitter and receiver circuits, namely, the contacts D′ 13 and D′ 14 are the terminals 13 and 14 of trigger circuit D′ in the transmitter of FIG. 3. Thus, in combination with the circuits shown in FIG. 7 the connection through the code converter CC′ between the different bistable multivibrator trigger circuits A′ through H′ in the transmitter of FIG. 3 is shown to account for the eight exceptional signals in the 32 unit code which must be converted in this circuit into the six unit code according to the previous description, and as marked "T and R" and "T" in FIG. 2.

For the purposes of illustration, the conversion of the letter "A" will be traced through the transmitter code converter circuit CC′ from its five unit code signal to its six unit code signal in combination with the resistor-diode circuit 71 shown in FIG. 7.

According to the general rule that the fourth element of a signal in a six unit code is derived from the second element of the signal in the five unit code in such a way that the derived element has a polarity contrary to the polarity of the element from which it is derived, this five unit signal is converted into *xx oo oo*. However, the frequency derived from the third and fourth unit (the second element of the radio channel) would be similar to that derived from a fifth and sixth unit (the third element of the radio channel) which is contrary to the general rule that two successive elements in a signal must have different frequencies, so that a conversion thereof is carried on as follows:

The upper terminal of this circuit 71 in FIG. 7 is connected to the input terminal 14 of the trigger circuit D′ and the lower terminals are respectively connected to the output terminals 12 of the trigger circuits C′, E′ and F′, and to a positive potential through a resistor R 71. In this case the trigger circuit D′ which provides the fourth unit of the six unit code is at normal. In the normal condition its tube V as shown in the circuit of FIG. 6a is conductive and its tube V′ is non-conductive. The third element of letter "A" in the six unit code is a spacing element or "o." The trigger circuit C′ which provides this element is at normal. The output terminal 12 of this trigger circuit C′ has a high potential, in that the tube V′ is non-conductive. The fifth element of the letter "A" in the six unit code is a spacing element or "o" also. The trigger circuit E′ which provides this element is at normal. The output terminal 12 of this trigger E′ also has a high positive potential. The sixth element of the letter "A" in the six unit code is also a spacing element "o." The trigger circuit F′ which provides this element is at normal, and its output terminal 12 likewise has a high positive potential. Thus, the terminals C′12, E′12, and F′12, of the circuit 71 in FIG. 7 in the resistor diode combination 71 all have high positive potentials, and the upper end of the resistor R 71 is consequently also positive. If one of the terminals C′12, E′12 or F′12 had a low or negative potential, the upper end of the resistor R 71 would not become positive. Now that all of the points at the lower end of the circuit 71 are positive, the point D′14 also must become positive, which causes the trigger D′ to pass into its alternate state and its tube V′ to become conductive and its tube V to be non-conductive. Thus, the letter "A" is converted into the six unit code *xx ox oo*. In this case and in all the seven other exceptional cases, the fourth unit in the six unit code agrees in polarity with the second unit of the five unit code.

Another example of an exceptional case will be described in which not only the fourth unit, but also the third unit of the six unit code is converted in the code converter such as for the letter "K" which in the five unit code is *xxxxo*, and in the six unit code without special conversion becomes *xx xo xo*. In this case the combination of the third and fourth unit is similar to the combination of the fifth and sixth unit. A conversion of only the fourth unit into a marking unit *x* would render the combination of the third and fourth unit similar to the combination of the first and second unit. The conversion of only the third unit into the spacing unit *o* would change the signal into a combination already used in another signal, namely for the letter "J." Consequently, in this case the third unit as well as the fourth unit must be converted. The third unit is converted by means of the resistor-diode combination 77 and the fourth unit by means of resistor-diode combination 72 in FIG. 7.

The first unit of the letter "K" in a six unit code is a marking unit "*x*." The trigger circuit A′ which provides this unit is operated on its off normal condition in that its tube V is non-conductive. The output terminal 10 of circuit A′ has a high positive potential and in the resistor-diode circuit 77 of FIG. 7 the point A′10 is accordingly positive. The second unit of the letter "K" in the six unit code is a marking unit "*x*." The trigger B′ which provides this unit is also off its normal condition so that its output terminal 10 has a high potential also, so that the point B′10 is positive in the circuit 77 of FIG. 7. The fifth unit of the letter "K" in the six unit code is also a positive or marking unit so that the trigger E′ which provides this unit is also in its off condition and its output terminal 10 is at a high positive potential corresponding to E′10 in the circuit 77. The sixth unit of the letter "K" in the six unit code is a spacing or "o" unit so that the trigger F′ which provides this unit is in its normal position and its output terminal 12 corresponding to the terminal F′12 in FIG. 7 has a high potential. Thus, the requirement is that at the upper end of the resistor R77 in this circuit 77 is also positive, and then the terminal C′13 of the circuit 77 must also become positive, and the trigger circuit C′ is restored to normal with its tube V becoming conductive so that the third unit of the six unit code will become a spacing unit or "o" as required.

Similarly, the fourth unit of the letter "K" is converted from a spacing unit into a marking unit. Likewise, conversion is effected for the other exceptional signals.

The conversion circuit CC′ connections employed in the receiver of FIG. 4 is shown in FIG. 8 in which only four exceptional signals need to be converted, namely those for the letters B, X, T and "Line Feed" for whose conversion are required only four separate resistor-diode circuits 81, 82, 83 and 84. In these four signals only the third unit of the six unit code received must be converted (see letters "T and R" in FIG. 2).

By way of example the conversion of the letter "K" will be described: This letter as received is *xx ox xo* and is converted by means of resistor-diode circuit 81. The second unit of this signal is a marking unit *x*. The trigger circuit F″ which provides this unit is now operated or off normal. That is, its output terminal 10 or F″10 has a high positive potential. The fourth unit of this letter "K" in the six unit code is a marking unit *x*, so that the trigger H″ which provides this unit is also in its off normal or operating condition, so that its output terminal H″10 is also positive. The trigger B″ has taken over the combination of the fifth and sixth units and since the filter F II″ before the trigger B″ is selective for the tone or frequency resulting from the combination *xo* (see FIG. 2), this trigger B″ is also operated or off normal, so that its output terminal B″10 has a positive potential. Thus, the requirement is met that the input terminal G″14 of the resistor-diode combination 81 in FIG. 8 can become positive, in that the upper end of the resistor R81 is also positive as a result of the fact that all of the terminals F″10, H″10 and B″10 are positive. The trigger G″, accordingly, passes into its operated state, and the third unit becomes a marking unit *x* in the five unit code. The fourth unit of the letter "K" in the six unit code need not be converted and is ignored in the conversion of the signal back into the five unit code. Thus, the signal appears in the five unit code at the output terminals of the triggers E", F", G", I" and J".

Similarly, the other four exceptional signals corresponding to the letters "Line Feed," T and X may be traced through the other resistor-diode combinations shown in FIG. 8.

VII. Conclusions

In the existing synchronous systems for transmission of multi-element code signals, the duration per element in a transmission path cannot be decreased arbitrarily in view of the continued element prolongations, as a result of which, the short element duration per signal would give rise to difficulties in the scanning, and lead to the loss of elements and to errors.

In the system according to the present invention, which is not a synchronous system and in which the detection of the frequency start or changes at the receiving end is essential, the duration per element in the transmission path can further be reduced than that which is possible in existing synchronous systems. In the system of this invention, the limits of duration of each element are set only by the inherent characteristics of the input filters of the receiving apparatus and the transient time of these filters. Thus, with an installation according to this invention, more channels can be transmitted via a multiplex channel than is known in synchronous installations.

As has been described, the conversion is derived from the second element of the arriving six unit signal, as it is found in the respective triggers F" and H", and from the last arriving element (combination of the fifth and sixth units) as it is found in one of the input triggers A" through D" in the receiving circuit. This last mentioned data could also be derived from the triggers I" and J", since these triggers also take up the fifth and sixth units of each signal, but this would have to be done at a later moment than it is done in the above described embodiment. The code converter can in said above described embodiment convert the signals at the same time as the fifth and sixth units are recorded in the triggers I" and J", and thus the conversion can be done by means of a simple impulse furnished from the impulse generator P1" of the counting circuit, which enables an economy of time.

Although the foregoing description is limited to the conversion of three element signals having four different frequencies, it can readily be seen that the system of this invention may be applied for the conversion, transmission and reception of other signals of other combinations, provided of course there is a difference in frequency between each adjacent element of the signal, and more than two elements are employed in each signal so that at least two different frequencies must be employed in each signal.

While there is described above the principles of this invention in connection with specific apparatus, it is to be clearly understood that this description is made only by way of example and not as a limitation to the scope of this invention.

What is claimed is:

1. A telecommunication system for frequency modulated code signals comprising: means for converting intelligence into signals having at least two successive elements in each signal with adjacent elements of each signal always having different frequencies, so that each independent signal has a predetermined number of frequency changes corresponding to the number of elements in each signal, means connected to said converting means for transmitting all of said frequency modulated elements of each code signal within a predetermined period of time, means for receiving said transmitted signals, means connected to said receiving means for detecting the frequency of each element of each received signal, and means connected to said detecting means for counting the number of elements received during a time corresponding to said predetermined time for transmission of said signal to determine if each signal received is a complete signal.

2. A system according to claim 1 wherein each of said signals comprises three elements selected from four different frequencies to provide thirty-six different code signal element combinations.

3. A system according to claim 1 wherein each signal comprises six successive units composed of three pairs of units which comprise said three elements of each signal.

4. A system according to claim 1 wherein said transmitting means includes means for time spacing each group of elements transmitted within said predetermined time composing each signal.

5. A multi-channel telecommunication system according to claim 4 wherein another channel of signals is interspersed in the time spaces between successive signals of the first channel.

6. A system according to claim 1 wherein said transmitting means includes means for time spacing each element in each signal.

7. A two-way telecommunication system between at least two stations each having a transmitter and a receiver, for frequency modulated elements of multi-element code signals; each transmitter comprising: input means for intelligence to be transmitted, means connected to said input means to convert said intelligence into code signals in which each signal has at least two successive elements and adjacent elements in each signal always have different frequencies, so that each independent signal has a predetermined number of frequency changes corresponding to the number of elements in each signal, and means connected to said converter means to transmit all said frequency modulated elements of each signal within a predetermined period of time; and each receiver comprising: means to receive said transmitted signals from a different station than that of this said receiver, means connected to said receiver to detect the frequencies of each element of each signal received, means connected to said detecting means for reconverting detected complete signals back into said intelligence, output means connected to said reconverting means for removal of said reconverted intelligence, counting means connected to said detecting means for counting the number of elements received during a time corresponding to said predetermined time for the transmission of said signals from said other station to determine if each signal received is a complete signal, and means connected to said counting means responsive to an incompletely received signal within said corresponding predetermined time for requesting the transmitter associated with this said receiver at the same station to request a repetition of the incompletely received signal by said transmitter of said different station, and simultaneously to prevent the operation of said reconverting means until a complete signal has been received by this said receiver.

8. A system according to claim 7 wherein one of said stations is a master station and the other is a slave station.

9. A system according to claim 7 wherein each said transmitter includes a plurality of multivibrator trigger circuits for storing said intelligence to be transmitted, a distributor connected to and controlling said trigger circuits, and a frequency generator circuit connected to and controlled by said trigger circuits and said distributor.

10. A system according to claim 9 wherein said code converter means comprises a plurality of resistor-diode circuits connected to said multivibrator trigger circuits.

11. A system according to claim 7 wherein said detecting means in each said receiver includes a plurality of frequency detecting filters, and a corresponding plurality of bistable multivibrator trigger circuits connected to said filters for storing the elements of said frequency modulator code signals for converting said stored elements into signals of another code.

12. A system according to claim 11 wherein said counting means comprises a plurality of monostable multivibrator trigger circuits controlled by said filters.

13. A system according to claim 12 wherein one of said monostable multivibrator trigger circuits includes an initial impulse generator.

14. A system according to claim 13 wherein said other monostable multivibrator trigger circuits are connected to said impulse generator and each include time delay circuits.

15. A system according to claim 7 wherein said output means at each receiver comprises a signal printer, and wherein said means responsive to said counting means includes means to block said printer.

16. A system according to claim 7 wherein said intelligence at said input means is in a five unit telegraph code, and wherein said converting means in each said transmitter transforms said five unit telegraph code signals into six unit three element frequency modulated code signals.

17. A system according to claim 16 wherein said reconverting means in each said receiver converts said frequency modulated signals formed in the transmitter back into the five unit telegraph code as they were originally applied to the transmitter.

18. An apparatus for converting a five unit signal code in which each unit is of two different kinds, into a three element signal code in which each element is of four different kinds and every two adjacent elements in any signal are different, said apparatus comprising: six input bistable multivibrator trigger circuits, five of which correspond to each unit of said five unit code signal, a converter circuit of resistor-diode combinations connected to and controlled by said five input circuits, means for connecting said converter circuit to control the other one of said six input circuits and one of said five input circuits, a pair of monostable multivibrator trigger circuits, one connected to half of said input circuits and the other connected to the other half of said input circuits, and a distributor connected to all of said above trigger circuits for producing said three element code from pairs of said six input circuits.

19. An apparatus according to claim 18 including an output bistable multivibrator trigger circuit connected to and controlled by said pair of monostable trigger circuits.

20. A transmitter including the converting apparatus according to claim 18 wherein said pair of monostable multivibrator trigger circuits include means to produce different voltages corresponding to said four different kinds of elements of said three element code signal, and said output multivibrator produces different frequencies corresponding to said different voltages.

21. In a receiver of a given multi-element code signal in which each adjacent signal element is distinguished by a change in frequency received within a predetermined period of time, said receiver comprising: a plurality of frequency selector filters for each different frequency element received, a first group of bistable multivibrator trigger circuits with one connected to each filter, a counting circuit connected to said first group of trigger circuits and comprising a second group of monostable multivibrator trigger circuits to count the number of elements received within said predetermined period of time, a third group of bistable multivibrator trigger circuits connected to said first and second groups of trigger circuits and corresponding to twice the number of elements in the code signal received, a code converter connected to said first group and pre-selected ones of said third group of trigger circuits for controlling some of said trigger circuits of said third group for producing a multi-unit code signal in a different code than that of the one received, an output bistable multivibrator trigger circuit connected to said third group of trigger circuits, and a distributor connected to said output trigger circuit and said third group of trigger circuits for successively controlling said output trigger circuit for producing said different code from the outputs from said third group of trigger circuits.

22. A receiver according to claim 21 wherein said code converter comprises a plurality of resistor-diode combinations connected also to said first group of multivibrator trigger circuits.

23. A receiver according to claim 21 wherein separate ones of said second group of multivibrator trigger circuits are connected to control successive pairs of multivibrator trigger circuits of said third group of trigger circuits.

24. A receiver according to claim 21 including a blocking device connected to said output multivibrator trigger circuit and said second group of counting monostable multivibrator trigger circuits for blocking said output trigger circuit when an insufficient number of elements for a signal has been received in said predetermined period of time.

25. A receiver according to claim 21 wherein said second group of counting monostable multivibrator trigger circuits includes an impulse generator and a separate monostable multivibrator trigger circuit corresponding to each element of the code signal being received connected to and controlled by said impulse generator.

26. A receiver according to claim 21 including means for generating stop and start impulses for each of said different code signals, when generating means is connected to said distributor.

27. A receiver according to claim 21 wherein said second group of monostable multivibrator trigger circuits in said counting circuit comprises: an impulse generator connected to each of said filters and responsive to the starting of each said different filter, a series of separate trigger circuits connected to and successively operated by each response of said impulse generator, and time delay means for each said separate trigger circuits to return it automatically to its initial unoperated condition a given time after the last impulse from said generator.

28. A counting circuit according to claim 27 including an additional time delay circuit between each adjacent pair of said separate trigger circuits to prevent their simultaneous response to the operation of impulses from said impulse generator.

29. A counting circuit according to claim 27 wherein the inputs of said separate trigger circuits each include a resistor-diode combination for controlling their successive operation in response to successive impulses from said impulse generator.

References Cited in the file of this patent

UNITED STATES PATENTS

| | | |
|---|---|---|
| 1,326,727 | Hammond | Dec. 30, 1919 |
| 1,631,976 | Mathes | June 14, 1927 |
| 1,677,121 | Hammond | July 10, 1928 |
| 1,694,874 | Friedman | Dec. 11, 1928 |
| 2,235,755 | Bakker et al. | Mar. 18, 1941 |
| 2,470,145 | Clos | May 17, 1949 |
| 2,471,126 | Spencer et al. | May 27, 1949 |
| 2,510,485 | Vossberg | June 6, 1950 |
| 2,518,405 | Van Duuren | Aug. 8, 1950 |
| 2,540,442 | Grosdoff | Feb. 6, 1951 |
| 2,543,907 | Gloess et al. | Mar. 6, 1951 |
| 2,557,964 | Herbst | June 26, 1951 |
| 2,603,705 | Van Duuren | July 15, 1952 |
| 2,674,727 | Spielberg | Apr. 6, 1954 |
| 2,701,279 | Lovell et al. | Feb. 1, 1955 |